United States Patent [19]

Dolby et al.

[11] 3,813,688

[45] May 28, 1974

[54] MAGNETIC TAPE DUPLICATOR

[75] Inventors: Dale P. Dolby, Los Altos; Heinrich K. Sandrock, Palo Alto, both of Calif.

[73] Assignee: Ampex Corporation, Redwood City, Calif.

[22] Filed: Mar. 29, 1971

[21] Appl. No.: 128,996

[52] U.S. Cl. .................. 360/17, 274/3
[51] Int. Cl. .................. G11b 5/02
[58] Field of Search .................. 274/3; 179/100.2 E; 226/95

[56] References Cited

UNITED STATES PATENTS

| | | | |
|---|---|---|---|
| 2,965,723 | 12/1960 | Hoshino et al. | 274/3 |
| 3,231,163 | 1/1966 | Chambers | 226/95 |
| 3,472,971 | 6/1967 | Van Den Berg | 179/100.2 E |
| 3,544,732 | 12/1970 | Bauer | 179/100.2 E |
| 3,573,390 | 4/1971 | Frost | 179/100.2 E |
| 3,633,807 | 1/1972 | Williams | 179/100.2 E |

*Primary Examiner*—Harry N. Haroian
*Assistant Examiner*—John W. Shepperd

[57] ABSTRACT

A master tape and a copy tape are brought into superimposed adhesion contact upon a rotating drive drum located within a signal transfer excitation zone that is defined by vacuum columns for isolating the tapes from outside disturbances such as different speed or tension changes that would cause the tapes to slip or misregister with respect to one another while the transfer is taking place. The necessary pressure for the adhesion contact is provided by air pressure means clamping the tapes against the drum. The disturbances introduced by the drum, if any, affect both tapes to the same degree, and the air pressure means produces no disturbances, so that the tapes remain in perfect registration during the transfer process.

5 Claims, 4 Drawing Figures

INVENTORS
DALE P. DOLBY
HEINRICH K. SANDROCK
BY
Robert L. Clay
ATTORNEY

INVENTORS
DALE P. DOLBY
HEINRICH K. SANDROCK
BY
Robert G. Clay
ATTORNEY

MAGNETIC TAPE DUPLICATOR

BACKGROUND OF THE INVENTION

This invention relates to magnetic tape duplicators, and particularly to duplicators of the high speed dynamic type.

Previously dynamic transfer of signals from a master tape to a copy has been effected by apparatus for bringing the tapes into intimate contact and applying a transfer excitation, e.g., alternating magnetic fields of time-decreasing strength, radio frequency excitation, high frequency sound excitation, or heat or other stress excitation. The prior art includes machines for producing substantially "adhesion" contact between the tapes, meaning that substantially all the air has been removed from between the tapes and they are held together by atmospheric air pressure on both sides plus electrostatic and other forces, so that a positive effort is required to peel them apart. Adhesion contact appears to be produced with as small an average spacing ($h$) as 10 microinches between the tapes. The term "average" spacing is used because the roughness variations of the oxide surfaces of the tapes are in the same order of magnitude, i.e. 10 micro-inches peak-to-valley, and if the "average" spacing is of this order, then substantial contact is certainly being made at some common points of the confronting tapes, and transfer of signal can be efficiently effected. One of the problems, however, is that even if certain "peaks" of the respective tape surfaces are in contact, the intervening "valley" portions may be too far spaced apart, and increasing the tension of the tapes, even with the tapes laid on a rotating drum, does not alone cure this problem. Continuous radial pressure is needed along the entire length of tape path on a drum. Furthermore, where the pressure is applied even at a single point on the path around the drum, as for laterally squeezing out the entrained air from between the tapes, the use of two different mechanical "pinching" elements such as the drum and an associated pinch roller introduces different perturbations from each element. Vibrations, run-out and speed and tension variations produced by the drum affect the tape most closely engaging the drum, and the different vibrations, run-out and speed and tension variations produced by the pinch roller affect the other tape, with the result that the tapes are differentially affected and may slip or stretch with respect to one another during the transfer process, causing mis-registration and loss of signal accuracy in the copy tape. This effect can take place even when the pinch rollers are not driven but have different masses and vibrating frequencies than the drum. Isolation of the tapes from outside disturbances can be provided by means of vacuum columns (see e.g., co-pending application "Magnetic Tape Duplicator" Ser. No. 24,761 by Alfred F. Stahler, filed Apr. 1, 1970 and assigned to the present assignee). However, the problem of differential disturbances affecting the two tapes differently within the transfer zone still to some degree remains.

Accordingly, it is an object of the present invention to provide an improved apparatus for bringing a master tape and a copy tape into adhesion contact for excitation transfer duplication of the master tape signal.

It is another object to provide an apparatus as above described and having improved provision for protecting the superimposed tapes from differential disturbances causing mis-registration and inaccurate transfer.

SUMMARY OF THE INVENTION

The above and other objects are achieved in an apparatus described as follows. A master tape and a copy tape are brought into superimposed adhesion contact upon a rotating drive drum located within a signal transfer excitation zone that is defined by vacuum columns for isolating the tapes from outside disturbances such as different speed or tension changes that would cause the tapes to slip or mis-register with respect to one another while the transfer is taking place. The necessary pressure for the adhesion contact is provided by air pressure means clamping the tapes against the drum. The disturbances introduced by the drum, if any, affect both tapes to the same degree, and the air pressure means produces no disturbances, so that the tapes remain in perfect registration during the transfer process.

DESCRIPTION OF THE PREFERRED EMBODIMENTS

Figure 1:
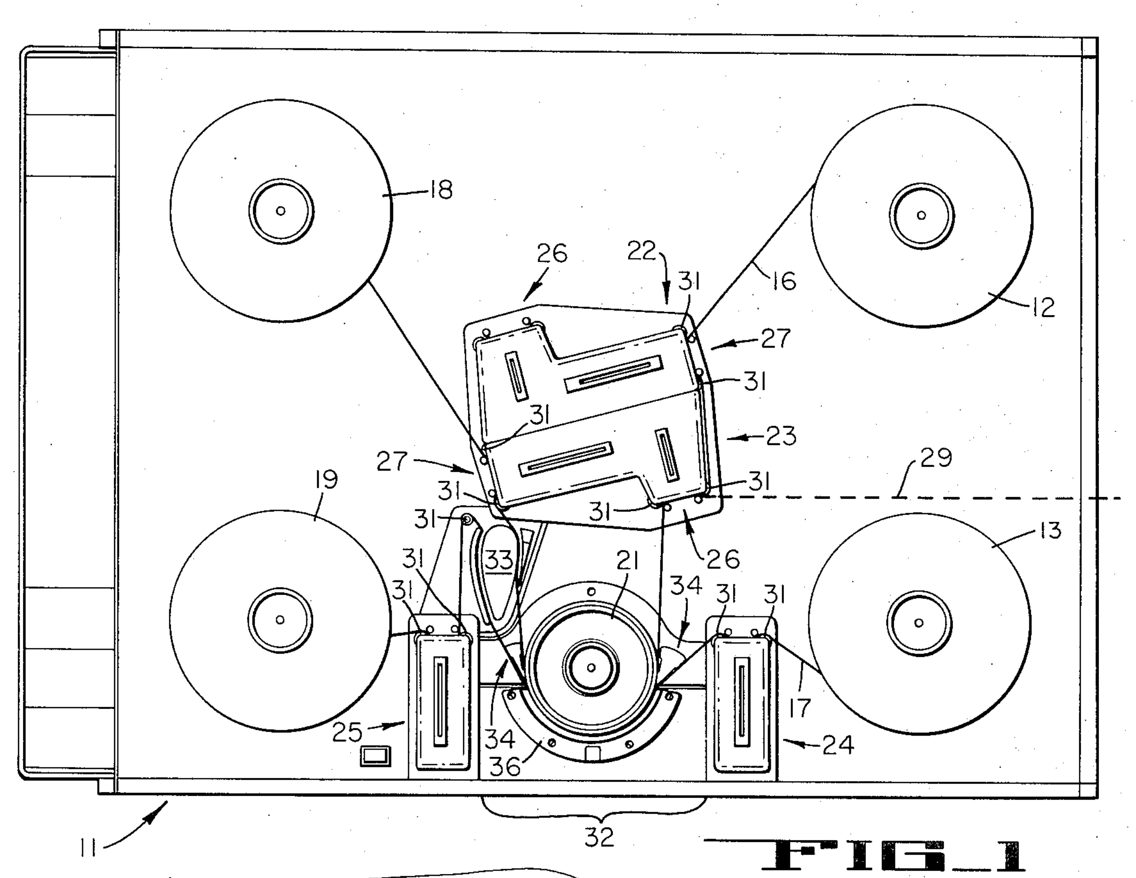
FIG. 1 is a plan view of an apparatus according to the invention.

Referring to FIG. 1, there is shown a tape duplicator 11 including supply reels 12 and 13 for a master tape 16 and copy tape 17, which are taken up on respective takeup reels 18 and 19. The tapes are driven in superimposed relation upon a rotating drum 21, driven by a motor (not shown). Motor drive means are also provided for the reels and are controlled by photoelectric loop length sensing means of standard type forming part of vacuum column means 22, 23 24 and 25, so as to maintain tape loops of predetermined lengths in the columns. The columns 22 and 23 are of modular type each having in effect two tape columns 26, 27 at right angles to one another. In column 22 master tape 16 is looped in portion 27 from supply reel 12, and this same tape is further looped in portion 26 of column 23, which may alternatively be used as the master supply column for a master tape coming onto the machine from an adjacent machine along path 29, for example. Portion 27 of column 23 forms the takeup column from master tape 16. Portion 26 of column 22 is not used in the present configuration. Columns 24 and 25 for copy tape 17 are also of standard type; and all of the columns are provided with pressurized air bearing guides 31 at turning points of the tape path. The tapes are thus seen to be effectively constant tensioned and driven at constant speed while at the same time being effectively isolated from tension and speed variations originating in the reels or in any place outside the transfer zone 32 that is defined by the vacuum columns.

Within the transfer zone 32, the tapes separately engage different sides of stationary longitudinal head stacks 33 and tape cleaners 34 of standard type, but do not separately engage any rotating or otherwise moving parts. The rotating drum 21 carries both of the tapes concurrently, and it follows that any tension or speed variations that may be induced in the tapes by the drum 21 must affect both of the tapes to the same degree. Furthermore, the pressure that is needed to produce adhesion contact between the tapes is produced by the action of pressurized air from an arc-shaped hollow shoe 36, and cannot differentially affect the two tapes. Consequently, the tendency of the tapes to slip or otherwise blur the transfer of the signal to the copy tape is reduced to a minimum.

Figure 2:
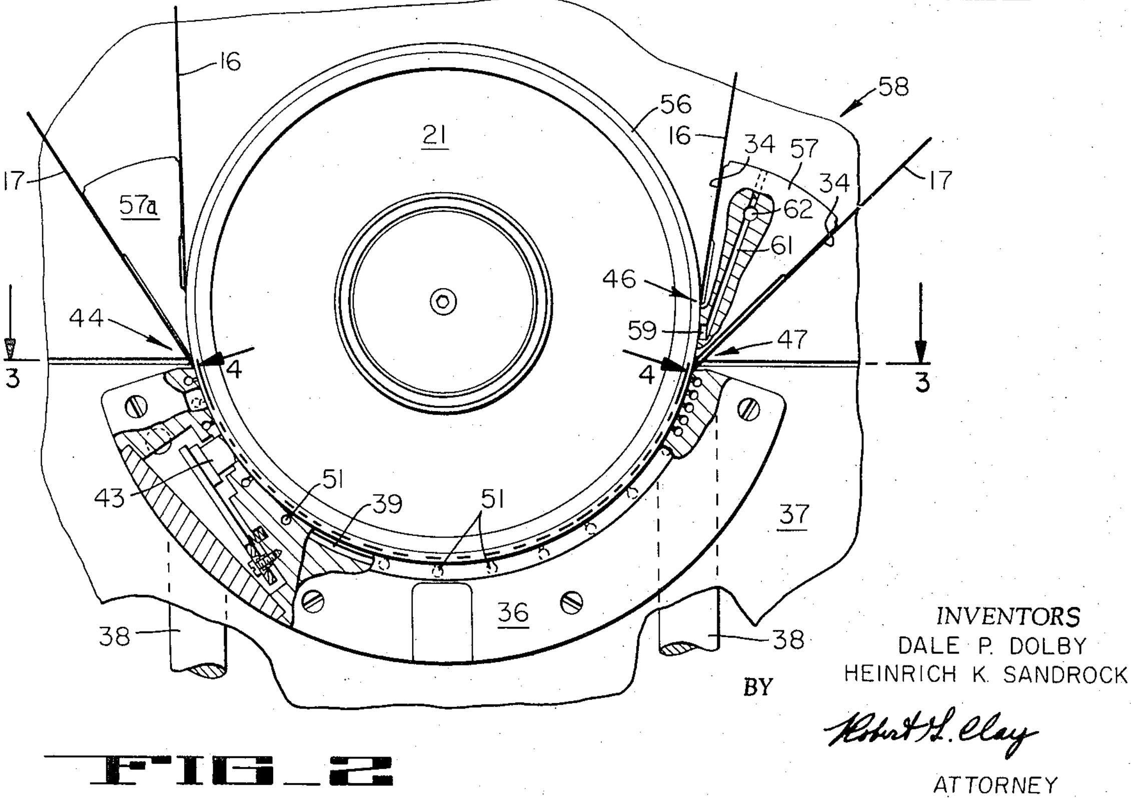
FIG. 2 is a fragmentary, broken-away enlarged plan view of a portion of the apparatus shown in FIG. 1.
Figure 3:
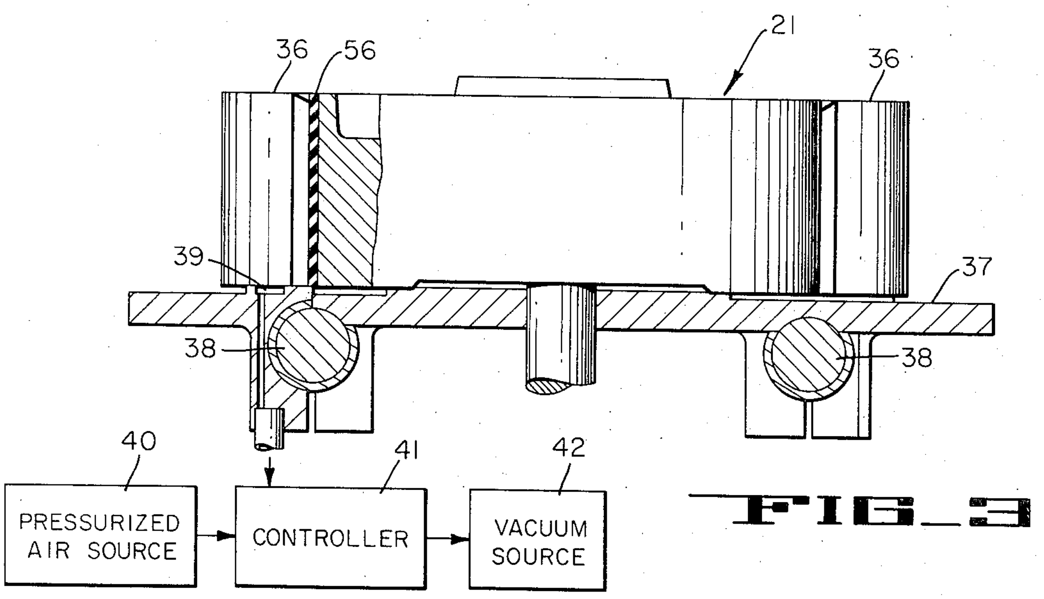
FIG. 3 is an elevation cross-section taken on the plane 3—3 of FIG. 2.
Figure 4:
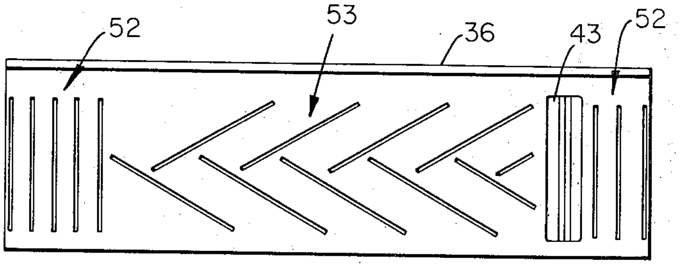
FIG. 4 is an elevation taken on the curved surface 4—4 of FIG. 2 and laid out flat on the page.

Details of the drum 21 and shoe 36 are also shown in FIGS. 2–4. The shoe is mounted on a plate 37 which slides on a pair of rails 38 so as to be retractable for a large dimension for cleaning and for a smaller dimension during threading and rewind modes as described below. In the upper surface of the plate 37 is formed an arc-shaped manifold groove 39 which is coupled on the supply side to a controller 41 and through the controller to a pressurized air source 40 during normal play. For rewind mode the controller 41 connects the groove 39 to a vacuum source 42 instead.

The shoe 36 has mounted interiorly thereof a magnetic transfer excitation head 43 near the exit point 44 of the tapes from the drum, and substantially removed from the entrance points 46, 47 of the master and copy tapes, so that air entrained between the tapes can effectively be squeezed laterally out before the tapes reach the transfer head 43.

The air pressure from groove 39 is transmitted to the tapes by means of conduit bores 51 communicating with slots 52 and 53 (FIG. 4) in the face of the shoe facing the tapes. Slots 52 are transverse slots spaced closely together, five at the tape entrance region to repel air that is entrained by frictional pumping action between the tapes in the zone of their convergence, and three in the exit region downstream from the head 43. The slots 53 are slanted in herringbone fashion so that entrained air is more effectively squeezed from the tape center line outwardly toward the edges. The dimensions and parameters of the apparatus, including tape speed, which is as high as possible, are selected to ensure that substantially all of the air is removed from between the tapes before they arrive at the transfer head 43.

Not only is it desirable to remove air from between the tapes during transfer, but for effective non-slip driving of the master tape 16 alone during shuttle (see below) as by the rubberized surface 56 of the drum, the tape 16 is pressed against the drum, and entrained air is squeezed out from between the drum and tape 16. As shown in FIG. 2, the guides 31 conduct the master tape 16 into tangency with the drum at a point 46 upstream from the point 47 at which the copy tape 17 would enter. A wedge-shaped element 57 is positioned within the zone 58 of convergence of the tapes, and pressurized air is supplied against the master tape 16 and drum above through a slot 59 and conduits 61, 62 also communicating with the controller 41. The tape cleaners 34 (not shown in detail) are conveniently mounted in the sides of element 57, and a duplicate element 57a (without tape cleaners) is supplied to the exit side for use during shuttle in the opposite direction.

It will also be noted in FIG. 2 that the copy tape 17 does not join the master tape 16 and drum along a line of tangency, but rather at an acute angle to the radius of the drum. This sharper "rake angle," as it is termed in the art, is provided to decrease the air pumping or entraining effect of the converging tapes, which effect decreases as rake angle increases, and increases as rake angle decreases. The angle is made possible by the effect of entrance grooves 52, which support the tape on an air bearing as it comes around the edge of shoe 36. The upstream side of the shoe may also be faced with hard material, such as tungsten carbide, to resist wear.

During rewind shuttle mode the shoe is retracted a small distance and the controller 41 supplies vacuum to the shoe to brake the copy tape, which does not need to be rewound, for it was recorded in reverse motion.

1. Apparatus for high speed dynamic transfer duplication of a magnetic copy tape from a magnetic master tape, comprising:

takeup and supply storage means for said tapes;

spaced vacuum column means for defining a tape transfer zone between said takeup and supply storage means, and for isolating said tapes from disturbances originating outside said zone;

a drum-shaped capstan and constant speed drive means therefor;

pressurized air means for pressing said tapes together in superimposed adhesion contact against said drum;

said pressurized air means including a hollow arc-shaped shoe concentric with said drum and the tapes thereon, and having spaced slots on the concave side thereof for directing pressurized air against said tapes and drum to produce said adhesion contact;

said slots being spaced more closely at the entrance point of said tapes on said drum to counteract the airbearing pumping effect and repel air that is frictionally entrained between the moving tapes in the region of their convergence;

said transfer excitation means being positioned near the exit point of said tapes from said drum and sufficiently far downstream from the entrance points of said tapes to said drum that substantially all of the air is squeezed laterally from between said tapes before said tapes reach said excitation means; and a source of pressurized air coupled to said shoe.

2. The combination recited in claim 1, wherein:

said slots are arranged to slant from the central region of the tape path outwardly and in a downstream direction toward both sides of said path, so as to squeezingly urge the residually entrained air laterally outwardly from between said tapes.

3. The combination recited in claim 2, wherein:

said slots are arranged in a herringbone pattern centered on said tape path.

4. The combination recited in claim 1, wherein said pressurized air means also includes:

first air bearing guide means arranged to guide said master tape into tangency with said drum at a predetermined first entry point;

second air bearing guide means arranged to guide said copy tape into engagement with said drum and copy tape at an acute angle to the drum radius at a second entry point substantially downstream from said first entry point; and a wedge-shaped pressurized air jet means positioned in the convergence region of said tapes for selectively clamping said master tape to said drum between said first and second entry points.

5. The combination recited in claim 1, wherein:

said shoe is mounted for threading and rewind retraction radially away from said drum; and vacuum source means and control means therefor are coupled to said shoe for holding said copy tape away from said drum during the rewind and shuttling modes of said master tape.

* * * * *